United States Patent
Nozaki

(12) 
(10) Patent No.: US 6,389,347 B1
(45) Date of Patent: May 14, 2002

(54) VEHICLE DRIVING FORCE CONTROL WITH DIFFERENT CORRECTIONS FOR ENGINE TORQUE CONTROL AN CVT RATIO CONTROL

(75) Inventor: Mikio Nozaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/550,019

(22) Filed: Apr. 14, 2000

(30) Foreign Application Priority Data

Apr. 16, 1999 (JP) ............................................ 11-109387

(51) Int. Cl.[7] ............................ B60K 31/04; B60K 26/00
(52) U.S. Cl. ............................ 701/54; 701/90; 701/70; 477/43
(58) Field of Search ............................ 701/90, 70, 95, 701/54, 84, 85, 53; 477/43, 111, 48, 107, 110, 115, 118

(56) References Cited

U.S. PATENT DOCUMENTS

| | | | | |
|---|---|---|---|---|
| 4,735,114 A | * | 4/1988 | Satoh et al. | 74/866 |
| 5,216,608 A | * | 6/1993 | Ito et al. | 364/426.03 |
| 5,465,208 A | * | 11/1995 | Mochizuki et al. | 364/426.01 |
| 5,655,995 A | * | 8/1997 | Kondo et al. | 477/155 |
| 5,724,866 A | * | 3/1998 | Minowa et al. | 74/664 |
| 5,806,009 A | * | 9/1998 | Horiguchi | 701/58 |
| 5,832,400 A | * | 11/1998 | Takahashi et al. | 701/53 |
| 6,104,976 A | * | 8/2000 | Nakamura | 701/95 |
| 6,125,321 A | * | 9/2000 | Tabata et al. | 701/97 |

FOREIGN PATENT DOCUMENTS

| | | |
|---|---|---|
| JP | 62-110535 | 5/1987 |
| JP | 06-017684 | 1/1994 |

* cited by examiner

*Primary Examiner*—Tan Nguyen
*Assistant Examiner*—Dalena Tran
(74) *Attorney, Agent, or Firm*—Foley & Lardner

(57) ABSTRACT

A driving force control system is provided for an automotive vehicle powertrain. In the driving force control system, an ordinary (or base) target driving force (tTd#n) is determined in response to operator depression of an accelerator (APO) and vehicle speed (VSP). A driving force correction (ADDFCE) is determined in response to a running resistance increment. The driving force correction is added to the ordinary target driving force to provide a first corrected target driving force (tTde) to an engine torque control The driving force correction is multiplied with a correction coefficient (α) to provide a corrected driving force correction. The corrected driving force correction is add to the ordinary target driving force to provide a second corrected target driving force (tTdr) to a CVT ratio control.

8 Claims, 11 Drawing Sheets

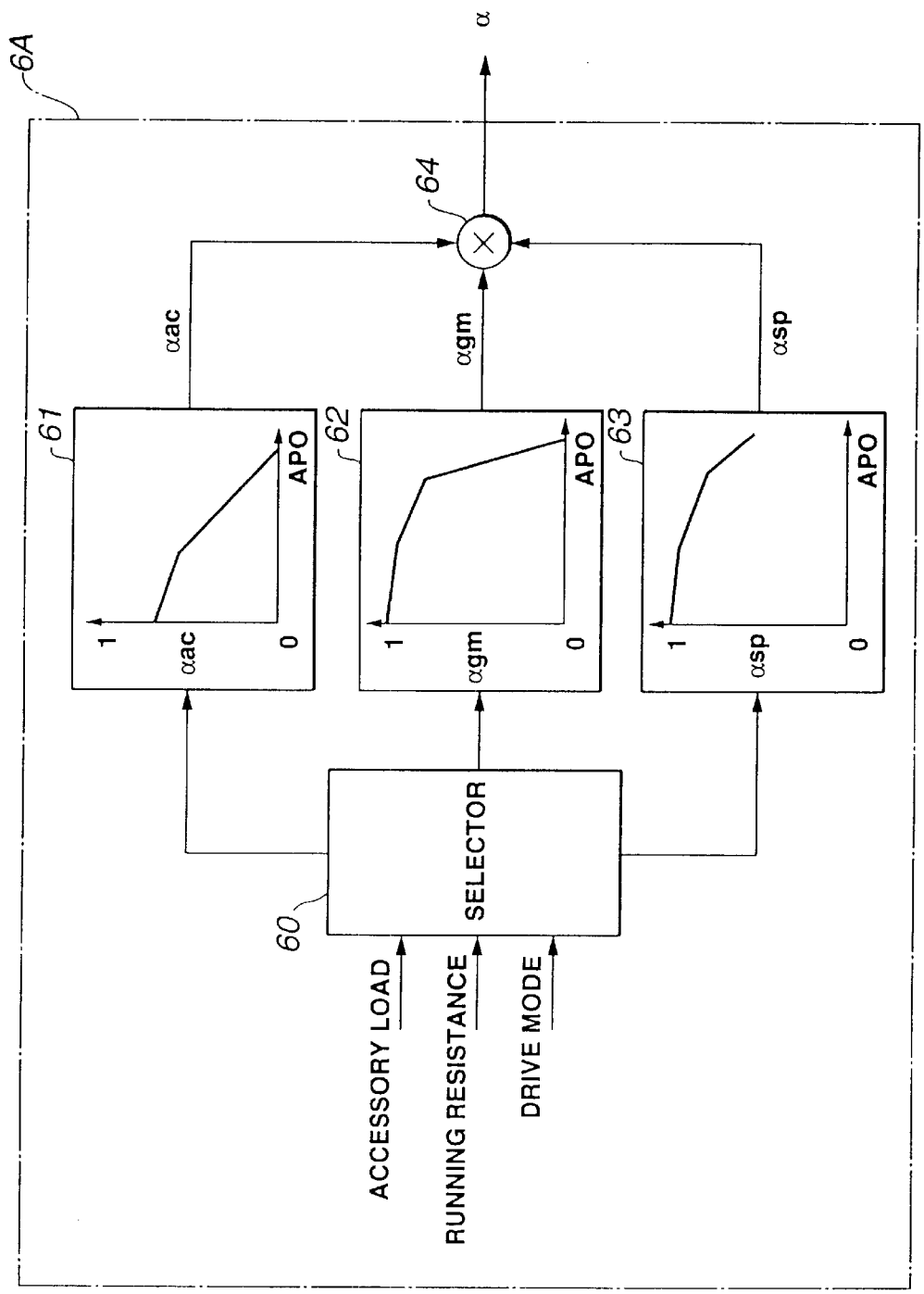

FIG.9
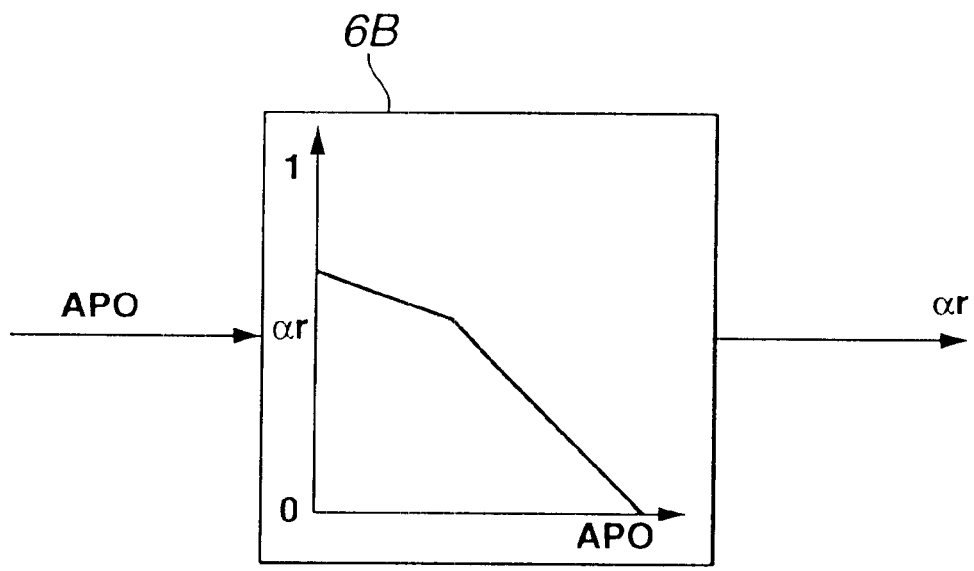
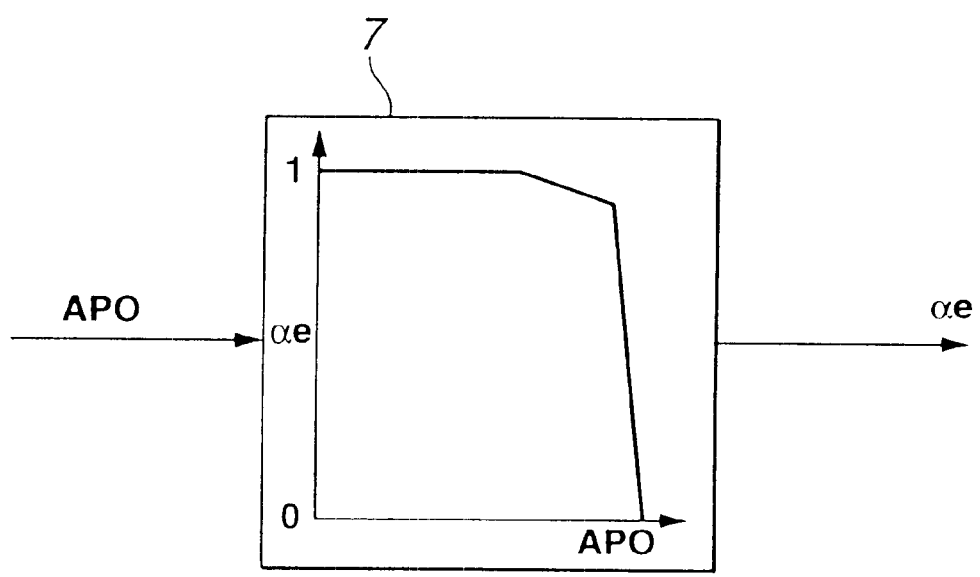

VEHICLE DRIVING FORCE CONTROL WITH DIFFERENT CORRECTIONS FOR ENGINE TORQUE CONTROL AN CVT RATIO CONTROL

FIELD OF THE INVENTION

The present invention relates to a vehicle driving force control, and more particularly to a driving force control system for a vehicle powertrain including a prime mover in the form of an internal combustion engine and a transmission in the form of a continuously variable transmission (CVT).

BACKGROUND OF THE INVENTION

The term "standard running resistance" is herein used to mean any force which opposes the motion of an automotive vehicle which is driven to keep on rolling over the surface of a flat road having 0% gradient at a constant vehicle speed. The term "running resistance" is herein used to mean any force that opposes the motion of an automotive vehicle, which is driven to keep on rolling over the surface of a road at a constant vehicle speed. Running resistance is equal to standard resistance if an automotive vehicle is driven to keep on rolling over the surface of a flat road having 0% gradient at a constant vehicle speed. Running resistance increases and becomes greater than standard resistance if the automotive vehicle is accelerated to increase speed from the constant vehicle speed. The term "acceleration resistance" is herein used to mean this increment or difference in running resistance that has occurred due to acceleration. Running resistance is greater when the automotive vehicle is driven to keep rolling over the surface of a flat road having gradient greater than 0% at a constant vehicle speed than standard resistance for the same vehicle speed. The term "gradient resistance" is used to mean this increment or difference in running resistance.

JP-A 62-110535 and JP-A 6-17684 disclose vehicular driving force control systems. According to JP-A 62-110535, a target horsepower is determined in response to accelerator position and vehicle speed. The target horsepower is used to determine a target CVT input speed. The target horsepower cooperates with the actual CVT input speed to determine a target engine torque. The target engine torque is used to determine a target throttle position of the engine.

According to JP-A 6-17684, standard target acceleration is determined in response to accelerator position, and actual acceleration is determined by differentiating a measure of a vehicle speed sensor. A deviation between them is integrated and then added to the standard target acceleration. The result is multiplied with a predetermined vehicle weight to give a target driving torque. The target driving torque is used in engine torque control and also in transmission ratio control.

A need remains to improve a driving force control system to carry out driving force correction without deteriorating the vehicle's operator drive comfort.

An object of the present invention is to provide a driving force control system to meet such need.

SUMMARY OF THE INVENTION

FIGS. 11 (A), 11 (B) and 11 (C) illustrate the case where the same driving force correction generated in response to the running resistance increment is added to an ordinary target driving force. In this case, the ratio is held at the largest ratio Lo before the vehicle's operator depression of the accelerator pedal increases to or near the fully depressed position. Thus, the engine speed increases during operation at or near the fully depressed position of the accelerator pedal. The present invention has avoided the occurrence of such exemplified case.

According to one aspect of the present invention, there is provided a driving force control system for an automotive vehicle powertrain including a prime mover and a continuously variable transmission (CVT), the prime mover being operable to accomplish a target output torque, the CVT being operable to alter a CVT ratio to accomplish a target ratio, the driving force control system comprising:

an accelerator pedal sensor to detect the vehicle's operator depression of an accelerator pedal of the vehicle;

a vehicle speed sensor to detect a vehicle speed of the vehicle; and a power train controller that is operative to determine an ordinary target driving force in response to the detected vehicle's operator depression of the accelerator pedal and the detected vehicle speed, to determine a driving force correction, to determine a first corrected target driving force after correcting the determined ordinary target driving force in response to the determined driving force correction, to determine a second corrected target driving force after correcting the determined ordinary target driving force in response to the determined driving force correction, said first and second corrected target driving forces being different from each other, and to determine the target output torque and the target ratio in response to the determined corrected first and second target driving forces, respectively.

BRIEF DESCRIPTION OF THE DRAWINGS

FIG. 7 is a portion of a third preferred implementation according to the present invention.

FIG. 9 is a portion of FIG. 8 illustrating correction coefficient αr and αe.

DESCRIPTION OF THE PREFERRED EMBODIMENTS

Figure 1:
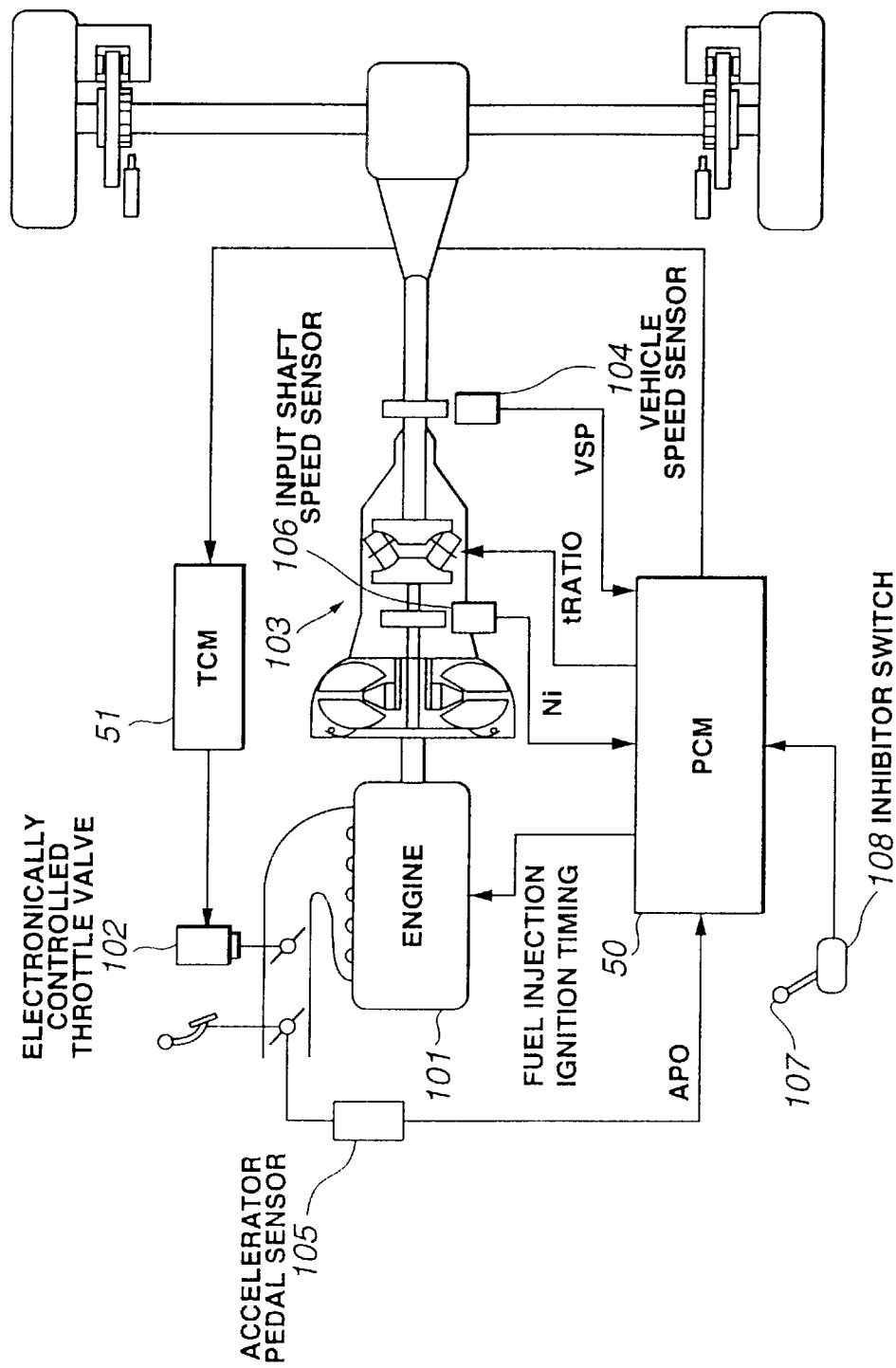
FIG. 1 is a block diagram of an automotive vehicle having driving wheels, a powertrain including an engine and an automatic transmission, and a powertrain control module (PCM).

Referring to the accompanying drawings, FIG. 1 is a schematic view of an automobile installed with a driving force control system implementing the present invention.

The automobile has a powertrain including a prime mover in the form of an internal combustion engine 101 and an automatic transmission 103, and a powertrain control module (PCM) 50. Output from the engine 101 is transmitted via the automatic transmission 103 to driving wheels. The PCM 50 controls engine torque of the engine 101 and a speed ratio, a ratio between a transmission input shaft speed and a transmission output shaft speed, of the automatic transmission 103 in such a manner as to cause the powertrain to produce driving force desired.

An accelerator pedal position detector in the form of an accelerator pedal sensor 105 is operatively connected to a manually operable accelerator, such as for example, an accelerator pedal, to feed operator power demand to the PCM 50. The accelerator pedal sensor 105 detects vehicle operator depression of an accelerator pedal and generates an APO signal indicative of the detected depressing of the accelerator pedal or accelerator pedal opening (APO). This APO signal is fed as an input to the PCM 50. The automatic transmission 103 has a plurality of ranges that may be selected by a range select lever 107. An inhibitor switch 108 is operatively connected to the range select lever 107 to detect which range is being selected and generates a select signal indicative of the range being selected by the select lever 107. The select signal is fed as an input to the PCM 50. A vehicle speed sensor 104 detects the vehicle speed and generates a vehicle speed signal VSP indicative of the detected vehicle speed. The vehicle speed signal VSP is fed as an input to the PCM 50.

Based on input signals including the above-mentioned input signals, the PCM 50 conducts adjustment of engine torque of the engine 101 and adjustment of the ratio within the automatic transmission 103 to produce driving torque transmitted to the driving wheels. The adjustment of engine torque may be made by varying one of or any combination of fuel injection quantity Tp, intake air flow rate Qa, and ignition timing.

To adjust the intake air flow rate Qa, an electronically controlled throttle valve 102 is disposed in an intake passage of the engine 101. In response to a throttle valve opening command from the PCM 50, a throttle control module (TCM) adjusts the position of the throttle valve 102.

The automatic transmission 103 includes a torque converter and a continuously variable transmission (CVT) that can alter a ratio continuously in response to a ratio command from the PCM 50. The PCM 50 multiplies a predetermined constant with the vehicle speed VSP to give a transmission output shaft speed No. An input shaft speed sensor 106 detects revolution speed of the transmission input shaft and generates an input shaft speed signal Nin indicative of the detected speed of the transmission input shaft. The input shaft speed signal Nin is fed as input to the PCM 50. The PCM 50 calculates a ratio RATIO (=Nin/No) and determines the ratio command and applies it to a ratio control mechanism of the CVT 103 to match a target ratio tRATIO that is determined by the PCM 50. The CVT may be of the V belt type or the toroidal type.

The PCM 50 is in the form of a microprocessor that includes a CPU, a ROM, a RAM, and an input/output device.

Figure 2:
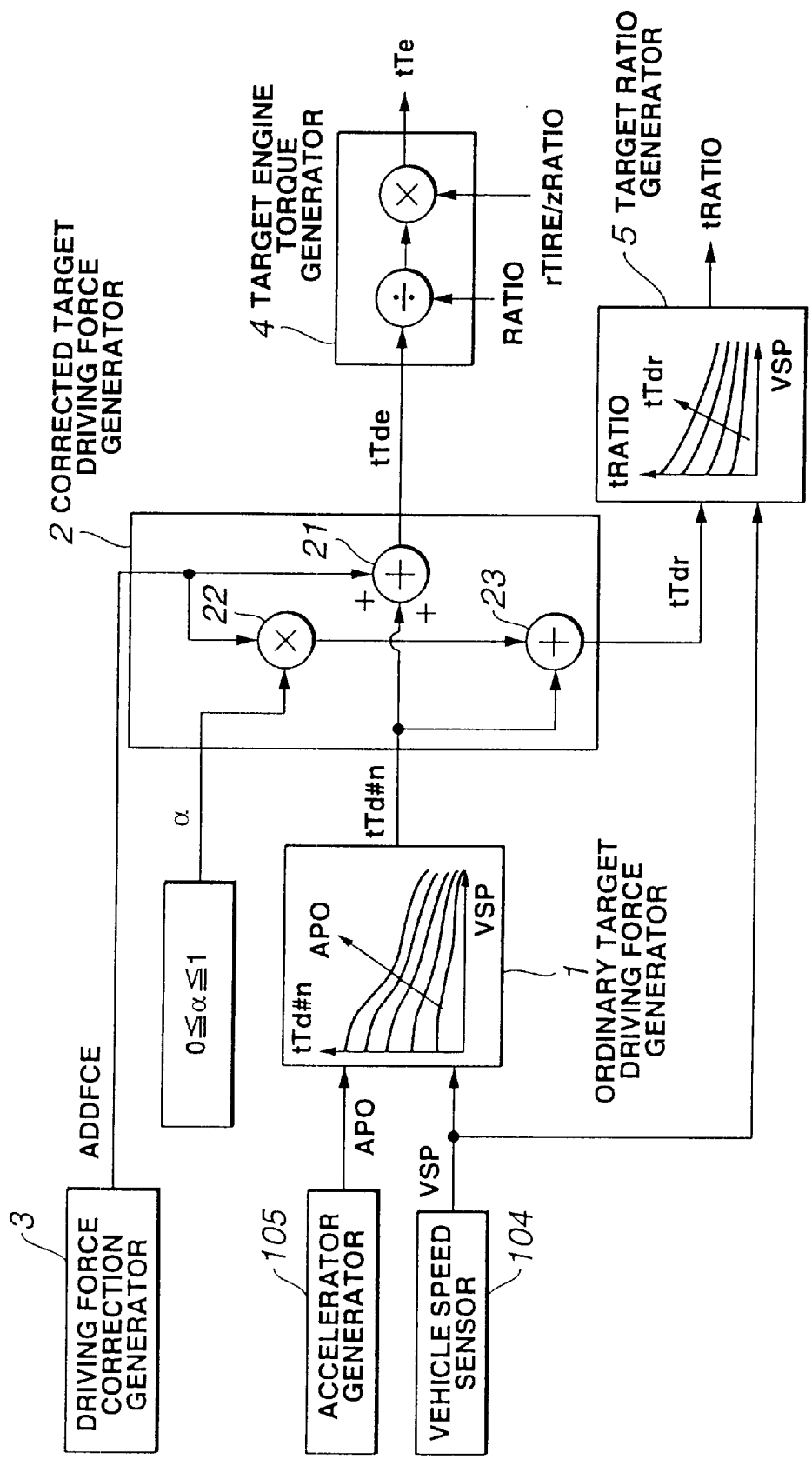
FIG. 2 is a control diagram, illustrating a first preferred implementation according to the present invention.

Referring now to FIG. 2, a description is made on driving force control carried out within the PCM 50.

FIG. 2 is a control block diagram of the driving force control It includes an ordinary target driving force generator (OTDFG) 1, a driving force correction generator (DFCG) 3, a corrected target driving force generator (CTDFG) 2, a target engine torque generator (TETG) 4, and a target ratio generator (TRG) 5.

The OTDFG 1 inputs APO and VSP. The OTDFG 1 includes a memory storing a predetermined tTd#n vs. (APO, VSP) map that defines various values of ordinary target driving force tTd#n needed for driving the vehicle on a flat road (with 0% gradient) at various values of VSP with various values of APO. The OTDFG 1 performs a table look-up operation of the map using APO and VSP to determine an ordinary target driving force tTd#n and provides the determined ordinary target driving force tTd#n to the CTDFG 2.

Thus, tTd#n can be expressed as $$TTd\#n = MAP (APO, VSP) \quad (1).$$

The DFCG 3 determines a driving force correction ADDFCE by, for example, performing a table look-up operation of a predetermined map using a running resistance increment (RESTRQ). The running resistance increment is a deviation of standard running resistance (RLDTRQ) from actual running resistance, which the automobile is subjected to. The standard running resistance (RLDTRQ) is predetermined for the automobile against vehicle speed (VSP).

In addition to tTd#n, the driving force correction ADDFCE and a correction coefficient $\alpha$ ($0 \leq \alpha \leq 1$) are fed to the CTDFG 2. This correction coefficient $\alpha$ is a fixed value and used in the CTDFG 2 in modifying ADDFCE. The CTDFG 2 calculates the sum of tTd#n and ADDFCE to give a first corrected target force tTde for use in engine torque control, and it calculates the sum of $\alpha$ ADDFCE and tTd#n to give a second corrected target force tTdr for use in ratio control.

The CTDFG 2 includes a summation point 21 where the summation of ADDFCE and tTd#n is carried out to give the first corrected target driving force tTde. The CTDFG 2 also includes a multiplier 22 and a summation point 23. At the multiplier 22, the correction coefficient $\alpha$ is multiplied with ADDFCE to give a modified driving force correction $\alpha$ADDFCE. At the summation point 23, the summation of $\alpha$ADDFCE and tTd#n is carried out to give the second corrected target driving force tTdr.

Thus, the first and second corrected driving forces tTde and tTdr can be expressed as $$tTde = tTd\#n + ADDFCE \quad (2),$$

$$tTdr = tTd\#n + ADDFCE \times \alpha \quad (3).$$

The CTDFG 2 provides tTde to a target engine torque generator (TETG) 4 and tTdr to a target ratio generator (TRG) 5.

The TETG 4 receives RATIO, rTIRE (=tire radius), and ZRATIO (=final gear ratio) as well as tTde and determines a target engine torque tTe after calculating the following equation:

$$tTe = tTde \div RATIO \times rTIRE \div zRATIO \quad (4).$$

The TETG 4 provides tTe to the engine 101. In order to realize tTe, the TCM 51 determines the position of the electronically controlled throttle valve 102, a control section of the engine 101 determines Tp and spark timing.

The TRG 5 receives VSP as well as tTdr and determines a target speed ratio tRATIO using VSP and tTdr. The TRG 5 has a memory storing a predetermined tRATIO vs., (tTdr, VSP) map that defines various values of tRATIO against various combinations of values of VSP and values of tTdr. In determining tRATIO, the TRG 5 performs a table look-up operation of this predetermined map using VSP and tTdr. The TRG 5 provides tRATIO to a ratio control mechanism of the CVT 103. The ratio control mechanism adjusts RATIO within the CVT 103 to tRATIO.

Figure 3:
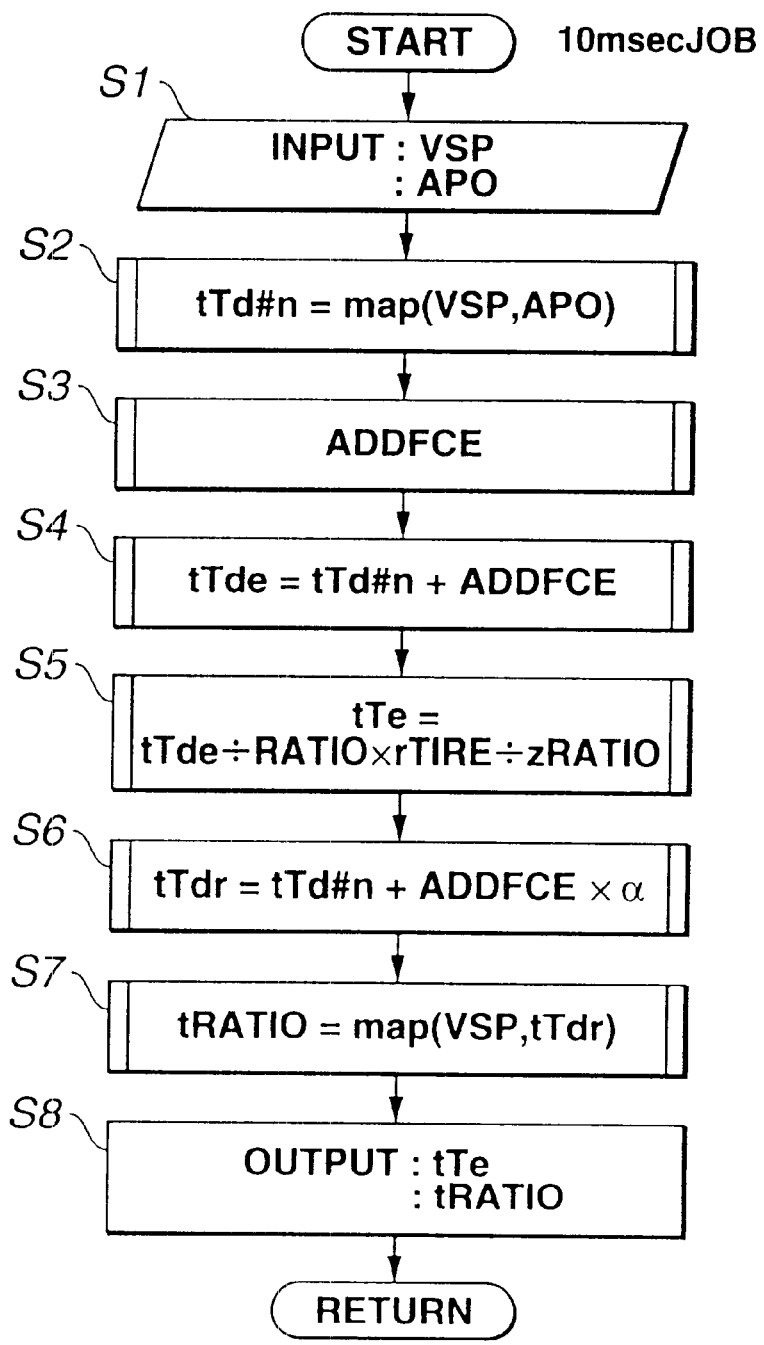
FIG. 3 is a flow chart of a control routine implementing the present invention.

FIG. 3 is a flow chart of a control routine implementing the present invention. The control routine is stored in the ROM of the microprocessor that forms the PCM 50.

At step S1, the CPU inputs VSP and APO.

At step S2, the CPU determines tTd#n by performing a table look-up operation, using APO and VSP, of the tTd#n vs., (APO, VSP) map illustrated in FIG. 2.

At step S3, the CPU determines ADDFCE by performing a table look-up operation of the predetermined map using the running resistance increment RESTRQ.

At step S4, the CPU determines the first corrected target driving force tTde by adding ADDFCE to tTd#n.

At step S5, the CPU determines tTe by calculating the equation (4) mentioned before.

At step S6, the CPU determine the second corrected target driving force tTdr by adding (ADDFCE×$\alpha$) to tTd#n.

At step S7, the CPU determines tRATIO by performing a table look-up operation of the tRATIO vs., (VSP, tTdr) map illustrated in FIG. 2 using VSP and tTdr.

At step S8, the CPU outputs tTe and tRATIO to be used in engine torque control and in CVT ratio control, respectively.

Figure 4A:
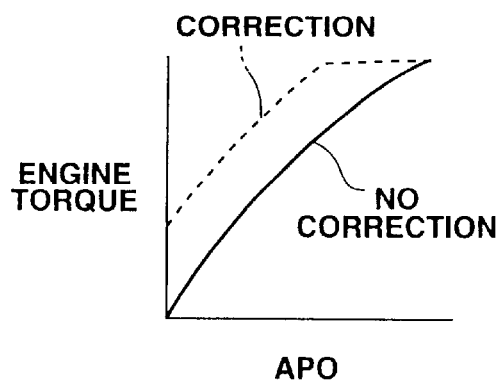
FIG. 4(A) illustrates, by a broken line curve, an engine torque vs., accelerator depression (APO) characteristic provided by the first preferred implementation as compared to that (illustrated by the fully drawn curve) provided by the case where there is no correction carried out in response to an increase in running resistance, namely a running resistance increment.
Figure 4B:
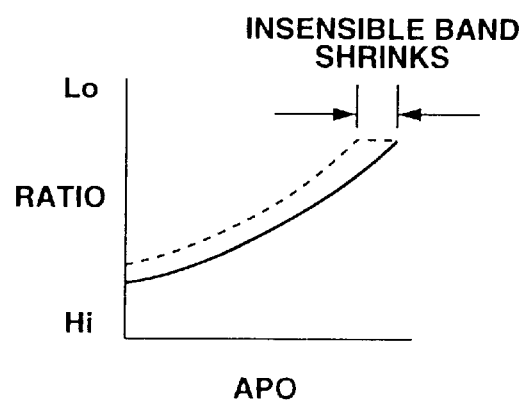
FIG. 4(B) illustrates, by a broken line curve, a CVT ratio vs., accelerator depression (APO) characteristic provided by the first preferred implementation as compared to that (illustrated by the fully drawn curve) provided by the case without any correction responsive to the running resistance increment.
Figure 4C:
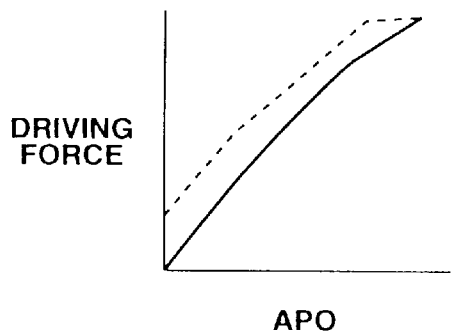
FIG. 4(C) illustrates, by a broken line curve, a driving force vs., accelerator depression (APO) characteristic provided by the first preferred implementation as compared to that (illustrated by the fully drawn curve) provided by the case without any correction responsive to the running resistance increment.
Figure 11A:
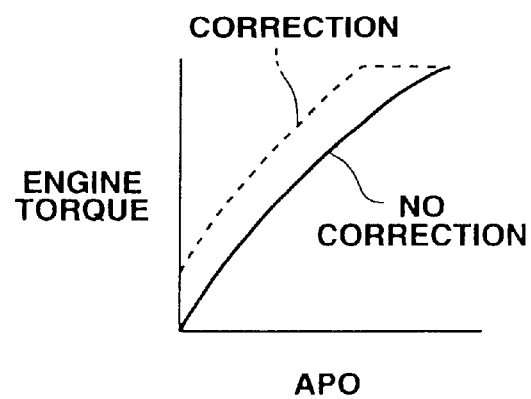
FIG. 11 (A) illustrates, by a broken line curve, an engine torque vs., accelerator depression (APO) characteristic provided by the before-mentioned less preferred system as compared to that (illustrated by the fully drawn curve) provided by the case without any correction responsive to the running resistance increment.
FIG. 11(B) illustrates, by a broken line curve, a CVT ratio vs., accelerator depression (APO) characteristic provided by the less preferred system as compared to that (illustrated by the fully drawn curve) provided by the case without any correction responsive to the running resistance increment.
FIG. 11(C) illustrates, by a broken line curve, a driving force vs., accelerator depression (APO) characteristic provided by the less preferred system as compared to that (illustrated by the fully drawn curve) provided by the case without any correction responsive to the running resistance increment.
Figure 11B:
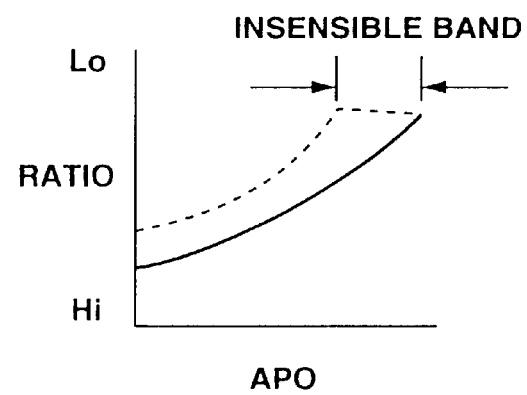
Figure 11C:
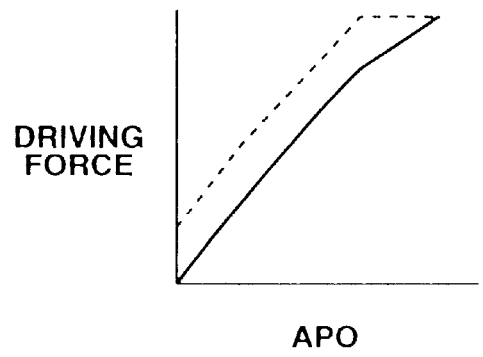

Referring to FIGS. 4(A) to 4(C), the engine torque (=tTe) increases as shown by the broken line curve in FIG. 4(A) and the CVT ratio (=tRATIO) as shown by the broken line curve in FIG. 4(B) as APO increases. Comparing FIG. 4(B) with FIG. 11(B) reveals that the insensible band where the CVT ratio is held at the maximum ratio Lo has become narrow because the amount of driving force correction has been reduced by the correction coefficient $\alpha$ in the first preferred implementation.

Figure 5:
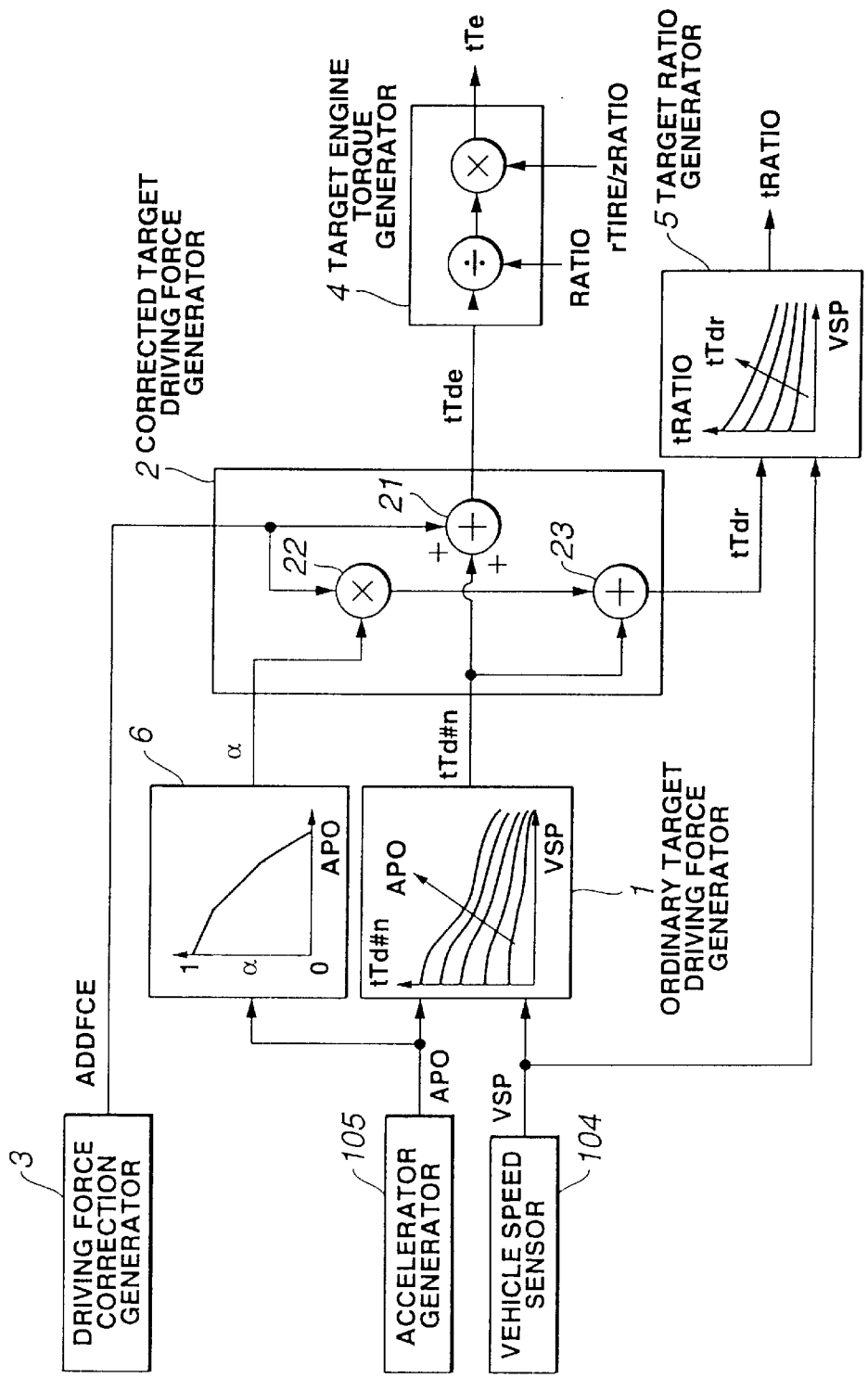
FIG. 5 is a control diagram illustrating a second preferred implementation according to the present invention.

FIG. 5 illustrates the second preferred implementation according to the present invention.

The second preferred implementation is substantially the same as the first preferred implementation except the provision that a correction coefficient $\alpha$ is no longer fixed, but it is subjected to variation versus variation of APO.

In FIG. 5, a correction coefficient generator (CCG) 6 includes a memory storing a $\alpha$ vs., APO map. The CCG 6 receives APO as an input and generates a correction coefficient $\alpha$. This correction coefficient $\alpha$ is fed to a multiplier 22 of a CTDFG 2. The correction coefficient $\alpha$ varies from 1 (one) to 0 (zero) with variation in APO as illustrated in FIG. 5 over a range from 0/8 to a predetermined value $\chi$ that is less than 8/8. The predetermined value $\chi$ is chosen such that the range of APO may be divided into three sub-ranges, namely, a first sub-range, a second sub-range, and a third sub-range, which correspond to operator weak power demand, intermediate power demand, and strong power demand, respectively. If APO is 0/8 and thus within the first sub-range, the correction coefficient $\alpha$ is in the neighborhood of 1 (one). If, now, APO is the predetermined value $_{102}$ and within the third sub-range, the correction coefficient $\alpha$ is in the neighborhood of 0 (zero). Roughly speaking, the correction coefficient $\alpha$ decreases from 1 toward 0 as APO increases from 0/8 toward the predetermined value $\chi$. Preferably, the correction coefficient a decreases as APO increases at a first rate over the first sub-range, at a second rate over the second sub-range, and at a third rate over the third sub-range. The first rate is the smallest, the third rate is the largest, and the second rate is larger than the first rate but smaller than the third rate.

With the second preferred implementation, the effect of ADDFCE on the CVT ratio control becomes less as the operator power demand through the accelerator pedal grows.

Figure 6A:
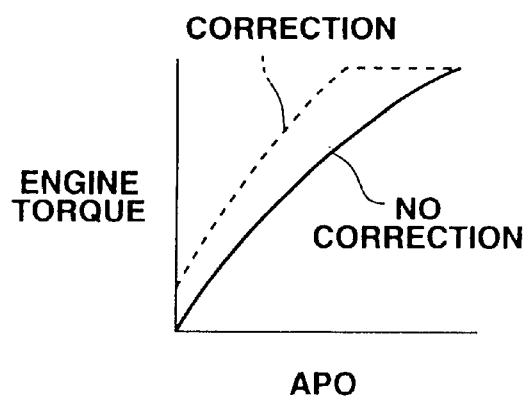
FIG. 6(A) illustrates, by a broken line curve, an engine torque vs., accelerator depression (APO) characteristic provided by the second preferred implementation as compared to that (illustrated by the fully drawn curve) provided by the case without any correction responsive to the running resistance increment.
Figure 6B:
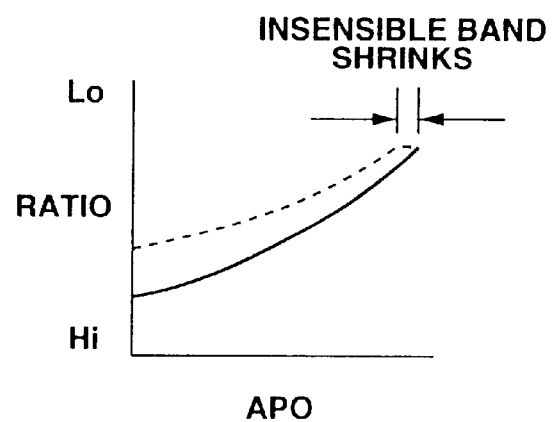
FIG. 6(B) illustrates, by a broken line curve, a CVT ratio vs., accelerator depression (APO) characteristic provided by the second preferred implementation as compared to that (illustrated by the fully drawn curve) provided by the case without any correction responsive to the running resistance increment.
Figure 6C:
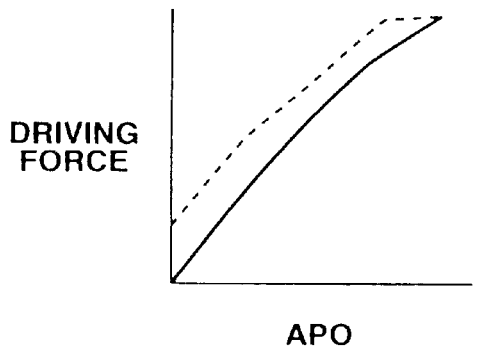
FIG. 6(C) illustrates, by a broken line curve, a driving force vs., accelerator depression (APO) characteristic provided by the second preferred implementation as compared to that (illustrated by the fully drawn curve) provided by the case without any correction responsive to the running resistance increment.
Figure 8:
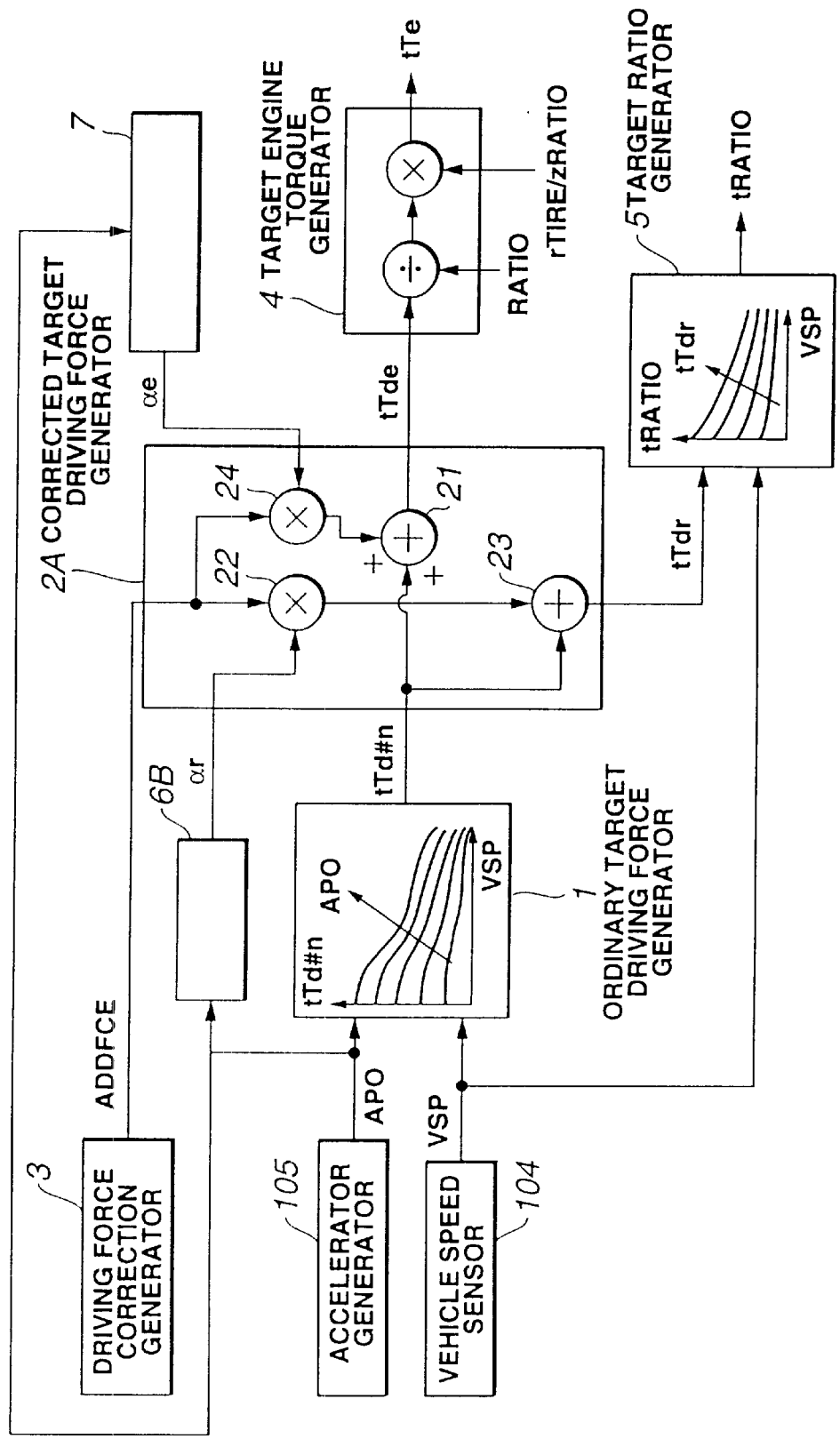
FIG. 8 is a control diagram illustrating a fourth preferred implementation according to the present invention.
Figure 10A:
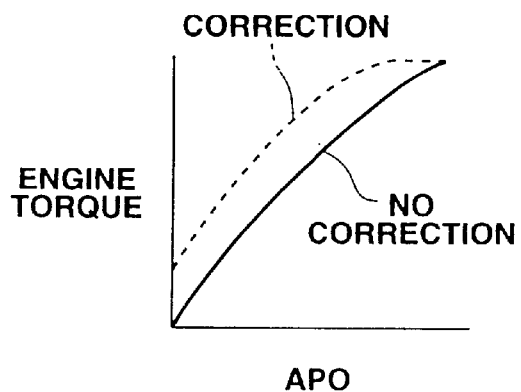
FIG. 10(A) illustrates, by a broken line curve, an engine torque vs., accelerator depression (APO) characteristic provided by the fourth preferred implementation as compared to that (illustrated by the fully drawn curve) provided by the case without any correction responsive to the running resistance increment.
Figure 10B:
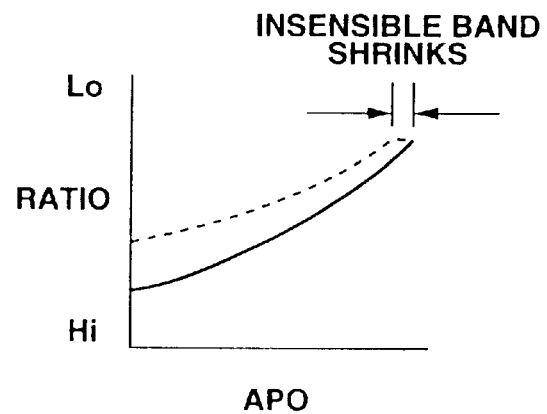
FIG. 10(B) illustrates, by a broken line curve, a CVT ratio vs., accelerator depression (APO) characteristic provided by the fourth preferred implementation as compared to that (illustrated by the fully drawn curve) provided by the case without any correction responsive to the running resistance increment.
Figure 10C:
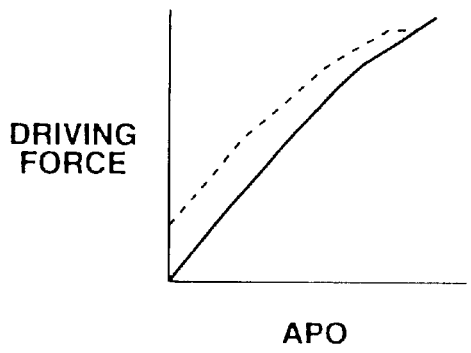
FIG. 10(C) illustrates, by a broken line curve, a driving force vs., accelerator depression (APO) characteristic provided by the fourth preferred implementation as compared to that (illustrated by the fully drawn curve) provided by the case without any correction responsive to the running resistance increment.

When the correction coefficient α is in the neighborhood of zero, the effect of ADDFCE on the CVT ratio control disappears. After the effect of ADDFCE on the CVT ratio control has become negligible or disappeared, the CVT ratio control is no longer running resistance dependent and resumes its normal ratio change in response to APO, providing engine speed variation fit to operator manipulation of the accelerator pedal. The insensible band has considerably shrunk as shown in FIG. 6(B).

Referring to FIG. 7, a description is made on the third preferred implementation according to the present invention. This third preferred implementation addresses the fact that the automobile is subjected to variations of various kinds of load including those not anticipated by the vehicle operator as well as those anticipated. It has been recognized and confirmed by tests conducted with operators of different ages, sex and driving skills that there is a need to cope with variation of load, which are not anticipated by operator, due to, for example, engine driven accessories such as an air conditioner pump, a power steering pump, and an alternator. Apparently, the operators felt discomfort when a CVT ratio change occurred to cope with a change in corrected target driving force as high as ADDFCE. This is because this CVT ratio change was not anticipated. The tests also reveled that most of the operators felt comfort with a CVT ratio change that occurred when a sporty or power mode was selected intentionally. This is because this CVT ratio change was anticipated and felt comfortable. Other kinds of load, such as an increase in road gradient and an increase in acceleration resistance due to a payload increase, may be recognized through operator perception. The tests revealed that a CVT ratio change caused by addition of ADDFCE to cope with these kinds of load needed some modification to gain popularity of operators.

The third preferred implementation is substantially the same as the second preferred implementation except the provision of a CCG 6A instead of the CCG 6.

The CCG 6A includes a selector 60. The selector 60 receives information as to which one or ones of accessory load, running resistance, and drive mode are put into an increment load, and renders the corresponding one or ones of three setting sections 61, 62, and 63 operable. The three setting sections 61, 62, and 63 are accessory load dependent correction coefficient setting section (ALDCCSS) 61, running resistance dependent correction coefficient setting section (RRDCCSS) 62, and drive mode dependent correction coefficient setting section (DMDCCSS) 62. The ALDCCSS 61 includes a memory storing an accessory coefficient αac vs., APO map, and it is rendered operable, when the accessory is put into operation, to generate an accessory correction coefficient αac. The RRDCCSS 62 includes a memory storing a running resistance coefficient αgm vs., APO map, and it is rendered operable, when the running resistance appears, to generate a running resistance correction coefficient αgm. The DMDCCSS 63 includes a memory storing a drive mode coefficient αsp vs., APO map, and it is rendered operable, when a sporty or power drive mode is selected, to generate a sport mode correction coefficient αsp. The generated correction coefficients αac, αgm, and coefficient αsp are multiplied at a multiplier 64 to give a combined correction coefficient α, which is fed to a CTDFG 2 at a multiplier 22 (see FIG. 5).

The accessory load, such as an air conditioner pump load, a power steering pump load, and an alternator load, is not recognizable and is subjected to variation against the vehicle operator's intention.

The setting of the map within the ADCCSS 61 is such that, in order to suppress variation of engine speed due to the variation of the accessory load, coefficient αac starts at a value lower than 1 (one) when APO is in the neighborhood of 0 (zero), decreases at a first rate as APO increases from zero toward a first point, and then decreases further at a second rate toward 0 (zero) as APO increases beyond this first point toward a second point. When APO is in the neighborhood of the second point, coefficient αac is zero. The second rate is greater than the first rate. The second point is in the neighborhood of the fully depressed position of the accelerator pedal. Accordingly, the driving force correction due to the accessory load is suppressed as the vehicle operator power demand increases and disappears at the fully depressed position of the accelerator pedal. Checking pressure of refrigerant may make it possible to detect air conditioner pump load. Similarly, checking of oil pressure may make it possible to detect power steering pump load.

Examples of running resistance recognizable are gradient resistance and acceleration resistance due to payload increase.

The setting of the map within the RRDCCSS 62 is substantially the same as that used within the CCG 6 (see Figure). As compared to coefficient αac, except at the second point of APO, αgm takes a value greater than coefficient αac does with the same APO. When APO is at the second point, coefficient αgm is 0 (zero).

Using a GPS (Global Positioning System) receiver and a digital map including altitude information may make it possible to estimate occurrence of gradient resistance. Reading of a vehicle weight sensor may make it possible to estimate occurrence of acceleration resistance.

The range selector lever 107 may be positioned to a so-called sporty or power mode wherein the vehicle operator expects operation at increased engine speed.

Upon selection of such sporty mode by the range select lever 107, operation at increased engine speed meets the vehicle operator power demand. Accordingly, the setting of the map used in the DMDCCSS 63 is such that coefficient αsp is slightly lower than 1 (one) except where APO is in the neighborhood of the second point.

Referring to FIGS. 8, 9 and 10(A)–10(C), a description is made on the fourth preferred implementation. The fourth preferred implementation is substantially the same as the second preferred implementation except the provision of a modified CTDFG 2A instead of the CTDFG 2 and the provision of a CCG 7 for use in engine torque control in addition to a modified CCG 6B for use in CVT ratio control.

FIG. 9 illustrate maps stored in memories of the CCG 6B and 7 that generate a ratio correction coefficient αr and an engine correction coefficient αe. The CTDFG 2A is different from the CTDFG 2 except that a multiplier 21 is provided to multiply αe with ADDFCE to suppress tTde.

The relationship between αe and αr is such that, except where APO is at the second point, αe is as high as 1 and always greater than αr.

According to the fourth preferred implementation, the influence of ADDFCE on the engine torque control is effective over most of the overall range of APO and the influence of ADDFCE on the CVT ratio control is suppressed. Accordingly, engine response as expected by manipulation of accelerator pedal is maintained.

In the preceding description on the preferred implementations, an increment in running resistance or a running resistance increment has been referred to in connection with FIG. 2. For full understanding of the running resistance increment, reference should be made to a pending U.S. patent application Ser. No. 09/513,459, filed Mar. 3, 2000 entitled "Process of Forming Standard Resistance Values and Vehicle Control Using Same", and claims priority based on Japanese Patent Application No. 11-58291 filed in Japan on Mar. 5, 1999. This pending United States Patent Application is hereby incorporated by reference in its entirety and commonly assigned herewith. Particular reference is made to FIG. 2 illustrating a driving torque generator (DTG) 2, a standard resistance generator 3, and a summation point to make subtraction of RLDTRQ from TRQALL to give RESTRQ.

This United States Patent Application, which has been incorporated by reference, has a corresponding European Patent Application that claims priority based on Japanese Patent Application No. 11-58291.

While the present invention has been particularly described, in conjunction with the preferred implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-109387, filed Apr. 16, 1999 is hereby incorporated by reference in its entirety.

What is claimed is:

1. A driving force control system for an automotive vehicle powertrain including a prime mover and a continuously variable transmission (CVT), the prime mover being operable to accomplish a target output torque, the CVT being operable to alter a CVT ratio to accomplish a target ratio, the driving force control system comprising:

an accelerator pedal sensor to detect the vehicle's operator depression of an accelerator pedal of the vehicle;

a vehicle speed sensor to detect a vehicle speed of the vehicle; and a power train controller that is operative to determine an ordinary target driving force in response to the detected vehicle's operator depression of the accelerator pedal and the detected vehicle speed, to determine a driving force correction, to determine a first corrected target driving force after correcting the determined ordinary target driving force in response to the determined driving force correction, to determine a second corrected target driving force after correcting the determined ordinary target driving force in response to the determined driving force correction, said first and second corrected target driving forces being different from each other, and to determine the target output torque and the target ratio in response to the determined corrected first and second target driving forces, respectively.

2. The driving force control system as claimed in claim 1, wherein said controller is further operative to determine said first corrected target driving force by adding said driving force correction to said ordinary target driving force, and to determine said second corrected target driving force by adding a modification of said driving force correction to said ordinary target driving force, and wherein said modification is less than said driving force correction.

3. The driving force control system as claimed in claim 2, wherein said controller is further operative to hold a ratio between said modification and said driving force correction at a predetermined value.

4. The driving force control system as claimed in claim 2, wherein said controller is further operative to vary a ratio between said modification and said driving force correction over most of the overall range of variation of the vehicle's operator manipulation of the accelerator pedal.

5. The driving force control system as claimed in claim 4, wherein said ratio decreases as the vehicle's operator depression of the accelerator pedal increases.

6. The driving force control system as claimed in claim 4, wherein said ratio is different depending on which one of various kinds of load that causes occurrence of driving force correction.

7. A driving force control method for an automotive vehicle powertrain including a prime mover and a continuously variable transmission (CVT), the prime mover being operable to accomplish a target output torque, the CVT being operable to alter a CVT ratio to accomplish a target ratio, the driving force control method comprising:

detecting the vehicle's operator depression of an accelerator pedal of the vehicle;

detecting a vehicle speed of the vehicle;

determining an ordinary target driving force in response to the detected vehicle's operator depression of the accelerator pedal and the detected vehicle speed;

determining a driving force correction;

determining a first corrected target driving force after correcting the determined ordinary target driving force in response to the determined driving force correction;

determining a second corrected target driving force after correcting the determined ordinary target driving force in response to the determined driving force correction;

said first and second corrected target driving forces being different from each other, and determining the target output torque and the target ratio in response to the determined corrected first and second target driving forces, respectively.

8. A driving force control system for an automotive vehicle power train including a prime mover and a continuously variable transmission (CVT), the prime mover being operable to accomplish a target output torque, the CVT being operable to alter a CVT ratio to accomplish a target ratio, the driving force control system comprising:

an accelerator pedal sensor to detect the vehicle's operator depression of an accelerator pedal of the vehicle;

a vehicle speed sensor to detect a vehicle speed of the vehicle; and a power train controller that is operative to:

determine an ordinary target driving force in response to the detected vehicle's operator depression of the accelerator pedal and the detected vehicle speed, determine a driving force correction, determine a first corrected target driving force by adding said driving force correction to said ordinary target driving force, modify said driving force correction to provide a modified driving force correction, determine a second corrected target driving force by adding said modified driving force correction to said ordinary target driving force, and determine the target output torque and the target ratio in response to the determined first and second corrected target driving forces, respectively, wherein said modified driving force correction is not greater than said driving force correction.

* * * * *